Jan. 5, 1937.　　　H. R. RAFTON　　　2,066,364
SCREENING DEVICE
Filed May 2, 1929　　　2 Sheets—Sheet 1
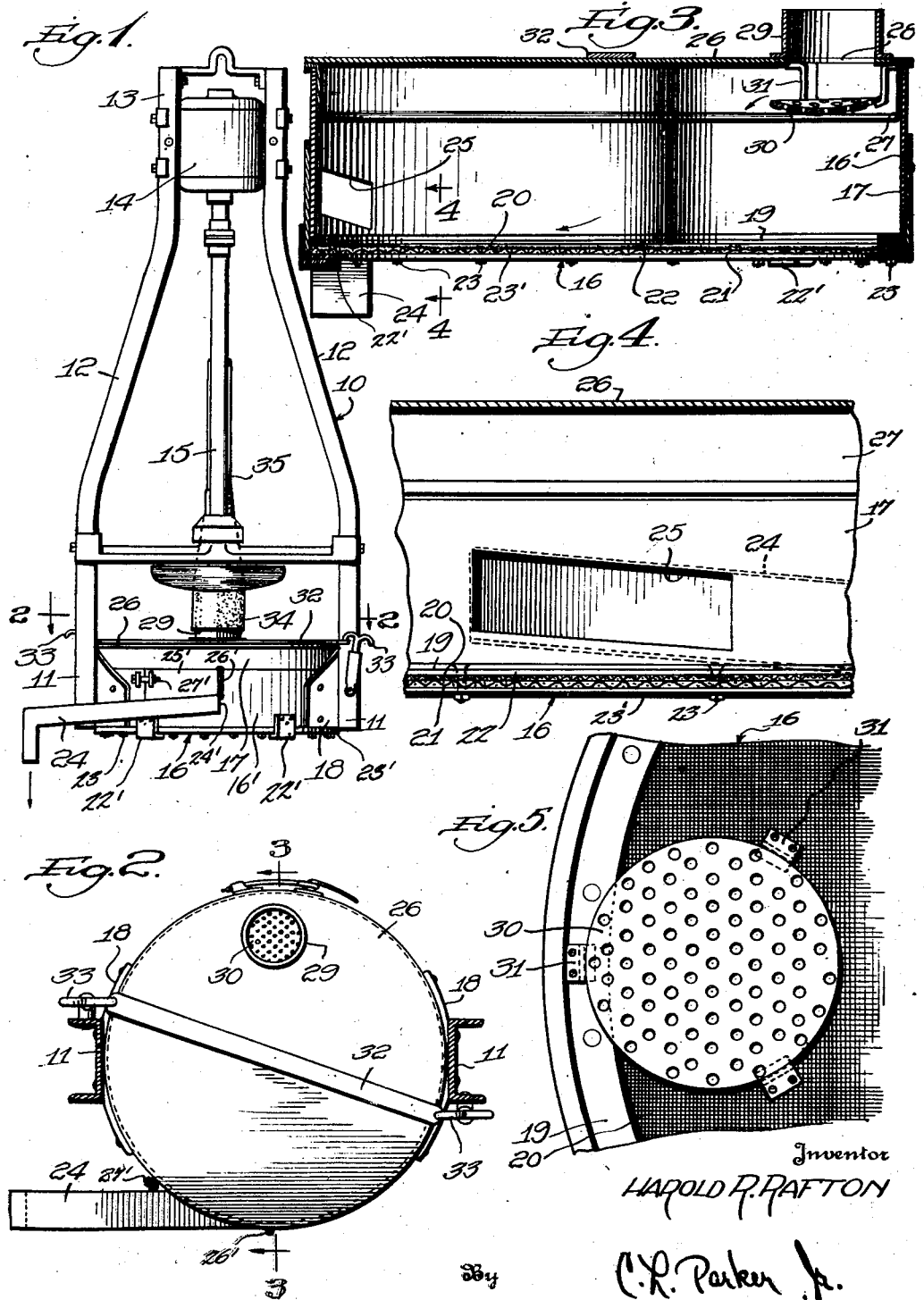

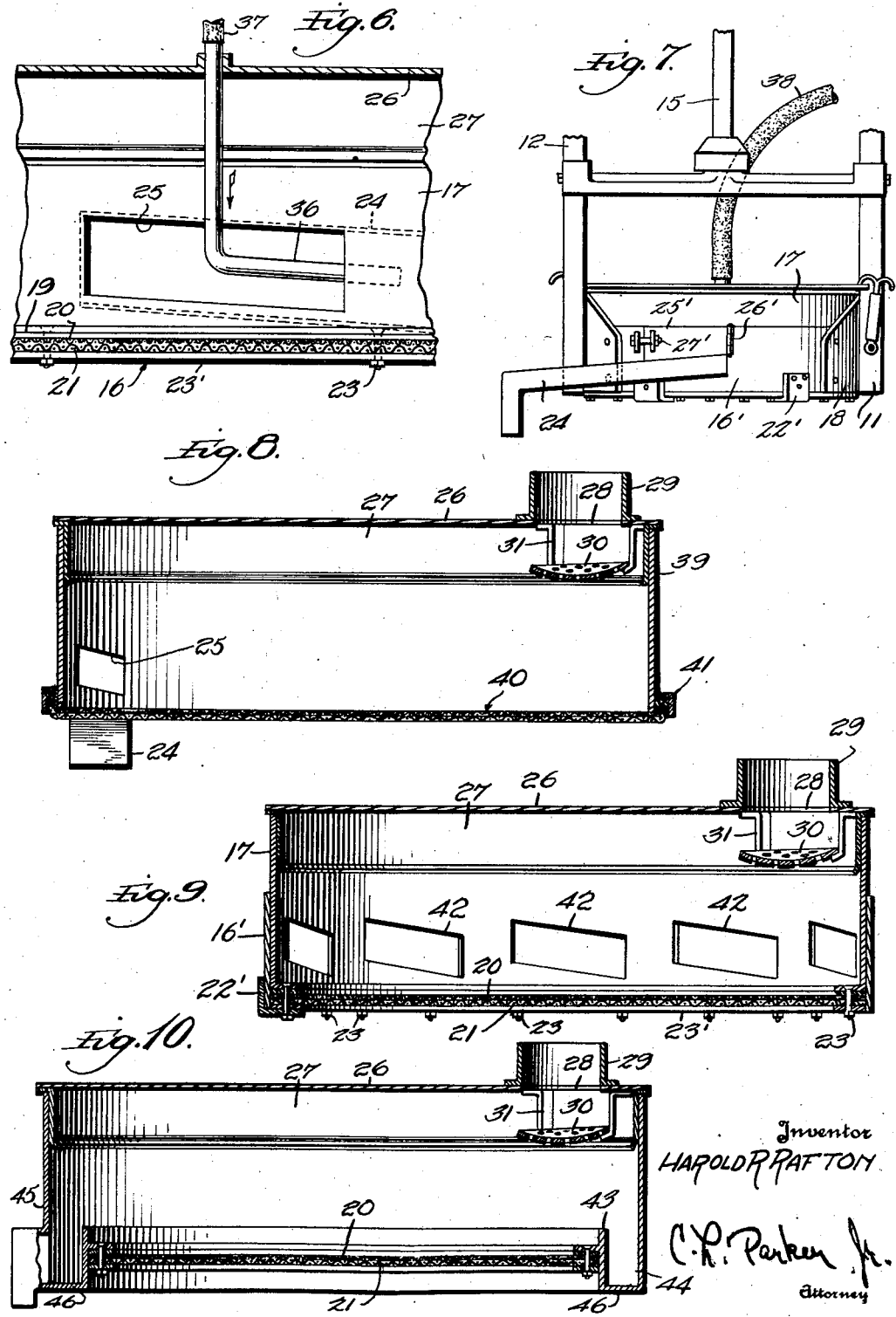

Patented Jan. 5, 1937

2,066,364

UNITED STATES PATENT OFFICE 2,066,364

SCREENING DEVICE

Harold R. Rafton, Lawrence, Mass., assignor to Rafton Engineering Corporation, a corporation of Massachusetts Application May 2, 1929, Serial No. 359,943

2 Claims. (Cl. 209—269)

This invention relates to improvements in the art of material screening, and more particularly relates to the screening of slurries containing paper pigment and like material.

A number of types of gyratory screens are available on the market, and such screens have been found effective for use in connection with many materials. These devices employ a cylindrical pan with a large bottom opening therein adjacent which is attached a screen, and a gyratory motion is transmitted to the pan and screen by suitable motor driven means. Where the material to be treated contains a relatively high percentage of coarse material which will not pass through the screen, however, frequent dumping and cleaning of the pan and screen is necessitated, thus rendering the use of the usual type of gyratory screens somewhat impracticable. Attempts have been made to render screens of this type continuous in operation by providing discharge spouts at the bottom of the sides of the pans through which the coarse material could pass to prevent its undue collection in the pan. A construction of this kind is practicable for use in connection with dry materials, but has been found to be wholly impracticable for use in screening liquid containing materials for the reason that a relatively large percentage of the liquid will flow by gravity from the discharge spout instead of passing through the screen.

For example, I have found with slurries such as the type occurring in the manufacture of paper pigments, where the concentration of pigment may be as high as 20 per cent. or more by weight of the total slurry, that the continuous discharge type of gyratory screens does not effect a substantially complete separation of the liquid containing the fine material from the coarse material. On the contrary, these devices have a tendency to discharge considerable quantities of fine material with the grit, and this is particularly true where the finer meshes of wire are employed as when necessary to effect a substantial separation of the grit from the fine particles in pigment manufacture.

An important object of the present invention is to provide a novel screening device which is particularly adapted for use in treating the slurries occurring in the manufacture of pigment, so as to permit a substantially complete separation of the grit from the fine particles.

A further object is to provide a device of the above mentioned character which is effective for retaining the liquids and fine particles in the screening pan to permit them to pass through the screen, and to provide novel means for the substantially continuous discharge of the grit and coarser particles from the pan.

A further object is to provide novel means for completely covering the pan so as to prevent the splashing out of material when the device is in operation, and to provide means associated with the cover for effecting a more uniform distribution of the incoming material over the area of the screen.

A further object is to provide a device of the above mentioned character having novel means for permitting the introduction of additional material into the pan, when desired, through the cover thereof.

Other objects and advantages of the invention will become apparent during the course of the following description.

In the drawings I have shown one embodiment of the invention. In this showing,

Figure 1 is a side elevation,

Figure 2 is a section on line 2—2 of Figure 1,

Figure 3 is a section on line 3—3 of Figure 2,

Figure 4 is a detail section on line 4—4 of Figure 3,

Figure 5 is a detail plan view of a portion of the pan showing the cover removed and the spreader in position in the pan, Figure 6 is a view similar to Figure 4 showing a modified form of the invention, Figure 7 is an elevation of the pan and associated elements showing another modification, Figure 8 is a sectional view similar to Figure 3 showing another modification, Figure 9 is an elevation of the pan and associated elements showing a further modification, and, Figure 10 is a section similar to Figure 3 showing an additional modification.

Referring to the drawings, the numeral 10 designates a pair of side frames having their lower ends 11 spaced apart a substantial distance, as shown in Figures 1 and 2. The intermediate portions of the side frames converge as at 12, while the upper ends 13 of the side frames are arranged fairly close together and are adapted to receive an electric motor 14 therebetween. The motor is connected to means including a drive shaft 15, for imparting a gyratory motion to the lower part of the frame and associated elements. The power means for the device forms no part of the present invention and need not be referred to in detail.

A pan indicated as a whole by the numeral 16 is arranged between the lower ends 11 of the side frame and within a clamping ring 16'. The pan includes a substantially cylindrical band 17, releasably held in position by the ring 16', which ring is attached to the lower ends of the side frames by suitable attaching plates 18. The lower edge of the band is turned inwardly as at 19 to form an internal annular flange against which is aranged a relatively fine mesh screen 20. If desired, a relatively coarse backing screen 21 may be arranged beneath the screen 20 to act as a suppport therefor. A gasket 22 is arranged between the flange 19 and the screen 20, and the gasket and the two screens are secured to the flange 19 by bolts 23 or other suitable fastening elements passing through an annular clamping plate 23'.

The clamping ring 16' is split vertically, preferably at a point diametrically opposite the discharge spout to be described, and the ring may be tightened by a toggle joint clamp (not shown) of any ordinary construction. The purpose of the split ring construction and the clamping joint therefor is to permit the diameter of the ring to increase when the clamp is released and thus allow easy removal of the pan, and to clamp the ring inwardly against the pan when the clamp is tightened, and thus cause the pan to be snugly held in position by the ring. The ring 16' is preferably provided at the lower edge thereof with a plurality of angular brackets 22' secured thereto and extending inwardly therefrom. The inwardly projecting portions of the angular brackets 22' contact with the clamping plate 23' of the pan, preferably between the bolts 23, and serve to support the pan in proper position.

A discharge spout 24 is fixed to and communicates with the pan to carry off coarse material therefrom. The spout is preferably inclined as shown in Figures 1 and 4 and is arranged preferably substantially tangentially with respect to the band 17 although it is to be understood that neither the inclination nor the tangential arrangement of the spout is a necessary feature. The latter element is provided with a relatively long opening 25 communicating with the upper end of the spout, and the opening is preferably inclined to conform to the inclination of the spout, as clearly shown in Figure 4. It will be noted that the entire lower edge of the opening 25 is arranged an appreciable distance above the bottom of the pan, for a purpose to be described. It also will be noted that the lower edge of the opening is arranged somewhat above the bottom of the spout 24.

The discharge spout 24 is normally arranged in an opening 24' formed in the clamping ring 16', and the portion of the opening 24' above the discharge spout is normally closed by a plate 25' hinged to the clamping ring at one end as at 26'. The opposite end of the plate 25' is normally secured in position by suitable fastening elements 27'. It will be apparent that the pan may be removed from the clamping ring by removing the spout 35, after disconnecting the sleeve 34, and by releasing the toggle clamp of the ring 16', and releasing the fastening elements 27' and swinging the plate 25' outwardly. Under such conditions, the spout 24 may be withdrawn upwardly through the top of the opening 24'.

The top of the pan is normally closed by a cover 26 having a depending cylindrical flange 27 fitting within the upper end of the pan. The cover is provided to one side thereof, preferably diametrically opposite the opening 25, with a charging opening 28 through which material is adapted to be fed into the pan. An upstanding cylindrical spout 29 is secured to the cover 26 over the opening 28. A spreader or distributor 30 is arranged beneath the opening 28. The spreader is preferably in the form of a perforated concave plate which is inclined downwardly toward its inner end, as shown in Figure 3, and the spreader is supported with respect to the cover 26 by suitable brackets 31.

Any suitable means may be employed for retaining the cover in position, and in the drawings a clamping bar 32 has been illustrated, the ends of which extend beyond the cover for engagement with spring pressed latches 33 carried, for example, by the lower ends of the side frames, as shown in Figures 1 and 2.

Means is provided to permit the intioduction of material into the pan while the gyratory motion thereof is taking place. As shown, the spout 29 is relatively large, and the upper end of this spout is frictionally engaged within a rubber or similar sleeve 34. This sleeve tapers to decrease in diameter toward its upper end, and the latter is connected to a supply pipe 35 which is materially smaller in diameter than the spout 29. The pipe 35 is removable, but when in position extends centrally into the spout 29, its lower end being approximately at the level of the top of the cover 26. The function of the sleeve 34 is to flexibly and removably connect the spout 29 with the pipe 35 in order that no splashings shall escape from the inside of the cover. The pipe 35 thus may remain rigidly fixed while the pan is in rapid gyratory motion.

The operation of the device is as follows:

A gyratory motion is transmitted to the pan 16 in the usual manner, by the operation of the means driven by the motor 14. Material is fed into the pan through the pipe 35, spout 29 and opening 28, the material falling upon the spreader 30. Some of the material passes through the openings in the spreader while most of the remaining material is directed toward the center of the pan by gravity, due to the inclination of the spreader, and this action is assisted by the gyratory motion of the device.

The portion of the band 17 beneath the opening 25 acts as a dam to prevent the direct passage of material from the level of the screen through the opening 25. The material in the pan thus will be maintained at an appreciable depth, and the gyratory action accordingly will be effective for substantially separating the grit and coarse material from the slurry. The grit (or oversize, as it may be termed) as it collects, aided by the gyratory action imparted to the pan, will be substantially continuously discharged through the opening 25, from whence it flows by gravity through the spout 24 to be discharged from the lower end thereof. The liquids and fine particles will gravitate toward the bottom of the pan and will pass through the screen 20. Thus it has been found that the device is particularly adapted for use in the separation of grit from the slurries occurring in the manufacture of paper pigments, which separation has been accomplished only with great difficulty with the present forms of screening devices.

If the grit becomes too dry for proper substantially continuous discharge, this discharge may be brought about by inserting a small pipe 36, say of ⅛" internal diameter, into the upper end of spout 24 as shown in Figure 6, said pipe being directed toward the lower end (discharge end) of the spout. The other end of said pipe may extend through the cover 26 and is flexibly connected as by rubber tubing 37 with a water supply. When said water supply is turned on, a small stream of water issues into spout 24 at its upper end, directed toward its discharge end, and this assists in discharging too dry grit from the discharge spout.

Of course, it is obvious that suitable separate means (not shown) are provided on the one hand to catch the slurry which has passed through the screen, and to conduct it away for use as desired, and on the other hand to catch the grit or oversize and conduct it away for disposal as desired.

The provision of the sleeve 34 and associated elements is such that refilling of the device may be accomplished while the gyratory action is taking place, the gyratory motion being so slight in amplitude that the material will flow directly from the pipe 35 on the spreader 30, and the fixed pipe 35 will not contact when properly centered, with the spout 29. Thus it will be apparent that the device may be continuously operated. The use of the spreader 30 assists in initially spreading the material evenly in the pan as it is introduced therein, thus tending to speed up the action of the device by utilizing a greater proportion of the screening area, and causing the screen wire to last longer because it is subjected to more even wear.

As an alternative method of introducing the slurry to the screen pan, the spout 29 may be made of small diameter, e. g., 1½", as shown in Figure 7 and be flexibly connected, as by a rubber hose 38, with a source of the slurry to be screened. However, I have found that such a connection does not usually afford so complete a non-interference with the gyratory motion of the screening device as does the thin rubber sleeve I have described above in my preferred embodiment.

The band 17 is preferably made of sheet metal, and the arrangement of the lower edge of the opening 25 above the bottom of the discharge spout 24 is for the purpose of permitting this edge to be cut to lower the bottom of the opening 25 if desired, according to the character of the material being screened. The pan 16 may alternatively consist wholly of a band 39 as shown in Figure 8, and a screening element 40 may be secured thereto by any suitable means, as for example, by a snugly fitting external circumferential band 41. When I use the word "pan" therefore, I mean to include such a structure, and when I use the expression "pan with a bottom opening", such a pan may be as described in my preferred embodiment, or in its simplest modification may consist merely of an annular band, without bottom or top.

If desired the pan 16 may be provided with more than one discharge opening, or even with a substantially continuous annular discharge opening in which case, of course, substantially the entire periphery of the pan wall acts as a discharge means. For example, the pan may be provided with a series of discharge openings 42, as illustrated in Figure 9, in which case the equivalent of a substantially continuous annular discharge opening is provided.

In another adaptation part of, or the entire, pan wall itself may be made sufficiently low to act as a discharge means for the oversize, in which case suitable collecting means for the oversize outside the pan wall should be provided, and also suitable covering means, as obviously if the cover be fitted snugly inside the pan wall in such case, the pan wall cannot function as a discharge means. Such a construction is illustrated in Figure 10 of the drawings. Referring to this figure it will be noted that the pan wall has its upper edge terminating relatively low as indicated at 43, and the oversize is discharged over the upper edge of the pan wall into a collecting trough 44 defined by an outer wall 45 and a bottom wall 46. The trough constitutes an annular discharge channel from which the oversize is discharged through a spout of the character previously described.

However any advantage in such arrangements is at the expense of the simplicity inherent in the single discharge opening above described, and for that reason I consider my single discharge opening preferable.

From the foregoing, it will be apparent that the present apparatus is clearly distinguished from such prior devices as gold washing machines, ore concentrators and separators, etc., wherein substantial agitation of the material on the screen is caused, or wherein the material is subjected to a substantial degree of centrifugal force. The gyratory motion imparted to the screen with the present device, in order to accomplish the desired results, must be relatively slight, as compared to the prior art structures referred to, in order that there will be a substantial absence of any substantial agitation or centrifugal force.

It is to be understood that the form of the invention herewith shown and described is to be taken as a preferred example of the same and that various changes in the shape, size and arrangement of parts may be resorted to without departing from the spirit of the invention or the scope of the subjoined claims.

I claim:
1. In a gyratory screening device, a pan having a bottom opening and a substantially cylindrical side wall, a screening element secured against said bottom opening, said pan being provided in its side wall with a discharge opening arranged wholly above the level of said screening element, a top for said pan, an inlet spout communicating with said pan through said top at a point substantially diametrically opposite said discharge opening, and a perforated spreader plate arranged beneath said inlet spout and inclined downwardly toward the center of said pan, said plate having a concave upper face.

2. In a gyratory screening device, a pan having a bottom opening and a substantially cylindrical side wall, a screening element covering said bottom opening, a discharge spout communicating with the interior thereof wholly above the level of said screening element, a top for said pan, an inlet spout communicating with the interior of said pan through said top at a point substantially diametrically opposite said discharge spout, and a perforated spreader plate arranged beneath said inlet spout and inclined downwardly toward the center of said pan, said plate having a concave upper face.

HAROLD ROBERT RAFTON.